US009533602B2

(12) United States Patent
Ito (10) Patent No.: US 9,533,602 B2
(45) Date of Patent: Jan. 3, 2017

(54) ELECTRONIC CONTROL DEVICE

(71) Applicant: DENSO CORPORATION, Kariya, Aichi-pref. (JP)

(72) Inventor: Hirotaka Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/003,976

(22) Filed: Jan. 22, 2016

(65) Prior Publication Data

US 2016/0221470 A1    Aug. 4, 2016

(30) Foreign Application Priority Data

Feb. 3, 2015   (JP) .................................... 2015-19515

(51) Int. Cl.
*B60L 15/20* (2006.01)
*B60W 20/00* (2016.01)
(Continued)

(52) U.S. Cl.
CPC ............ *B60L 15/2054* (2013.01); *B60L 1/003* (2013.01); *B60L 7/18* (2013.01); *B60L 11/12* (2013.01); *B60L 11/14* (2013.01); *B60L 11/1861* (2013.01); *B60L 15/2009* (2013.01); *B60W 20/14* (2016.01); *B60L 2240/12* (2013.01); *B60L 2240/16* (2013.01); *B60L 2240/423* (2013.01); *B60L 2240/425* (2013.01); *B60L 2240/525* (2013.01); *B60W 2540/16* (2013.01); *B60W 2710/083* (2013.01); *Y10S 903/906* (2013.01)

(58) Field of Classification Search
CPC ... B60L 15/2054; B60L 15/2009; B60L 11/14;
B60L 11/1861; B60L 1/003; B60L 7/18;
B60L 2240/423; B60W 20/14; B60W 2540/16; B60W 2710/083; Y10S 903/906
See application file for complete search history.

(56) References Cited

U.S. PATENT DOCUMENTS 8,035,349 B2 * 10/2011 Lubawy ................... B60L 7/10
318/376
8,335,603 B2 * 12/2012 Mitsutani ............... B60K 6/445
180/65.21
8,892,286 B2 * 11/2014 Morita ................... B60K 6/445
180/65.25

FOREIGN PATENT DOCUMENTS

JP        S59-080174 A    5/1984
JP        H10-098894 A    4/1998
(Continued)

*Primary Examiner* — Michael J Zanelli
(74) *Attorney, Agent, or Firm* — Posz Law Group, PLC (57) ABSTRACT

An electronic control device on a vehicle having a shift transmission operable by a driver includes: a battery; a motor generator; and a three-phase inverter executing an electricity conversion between the battery and the motor generator bi-directionally; a detector detecting a shift down operation; an obtaining device obtaining a negative torque corresponding to the shift down operation; a determination device determining whether the battery is chargeable; and a controller controlling the three-phase inverter to generate the negative torque at the motor generator. When the detector detects the shift down operation, and the determination device determines that the battery is not chargeable, the controller outputs a switching signal to all of three upper arms or all of three lower arms to turn on simultaneously, and outputs a shutdown signal to all of three upper arms or all of three lower arms with executing a PWM control of the shutdown signal.

4 Claims, 6 Drawing Sheets

(51) Int. Cl.
*H02P 27/08* (2006.01)
*B60L 7/18* (2006.01)
*B60L 11/18* (2006.01)
*B60L 1/00* (2006.01)
*B60L 11/12* (2006.01)
*B60L 11/14* (2006.01)

(56) References Cited

FOREIGN PATENT DOCUMENTS

| JP | 2006-311643 A | 11/2006 |
|---|---|---|
| JP | 4449942 B2 | 4/2010 |
| JP | 5450834 B2 | 3/2014 |

\* cited by examiner

ELECTRONIC CONTROL DEVICE

CROSS REFERENCE TO RELATED APPLICATION

This application is based on Japanese Patent Application No. 2015-19515 filed on Feb. 3, 2015, the disclosure of which is incorporated herein by reference.

TECHNICAL FIELD

The present disclosure relates to an electronic control device having a battery, a motor generator, and a three phase inverter.

BACKGROUND

JP-4449942 B2 teaches an electronic control device having a battery, a motor generator as a vehicle driving power source, a three phase inverter arranged between the battery and the motor generator and executing electricity conversion between the battery and the motor generator, and an electric continuously variable transmission. The electronic control device is mounted on the vehicle. The motor generator is defined as a MG, and the electric continuously variable transmission is defined as an electric CVT.

In the electronic control device, when an upper arm or a lower arm in one of phases in the three phase inverter short-circuits, and the rotation speed of the MG is higher than a predetermined rotation speed, all of the upper arms or all of the lower arms in three phases are controlled to turn on at the same time. Thus, when the three phase on-control is performed, the regeneration torque (i.e., brake torque) generated by the MG becomes smaller than a case where one phase short-circuits.

Recently, in order to drive the vehicle similar to the manual transmission, many vehicles use an electric CVT that is capable of shifting a transmission by an operation of a driver of the vehicle. The electric CVT is also defined as a CVT having a sequential shift function.

When the driver operates the shift lever to shift down the transmission, it is necessary for the vehicle to generate a negative torque corresponding to the shift down operation and to reduce a vehicle speed. For example, in the vehicle having the electric CVT, when it is necessary for the MG as the driving power source to generate the negative torque, the negative torque is to be generated at the MG in a manner without generating regeneration current if it is impossible to charge the battery.

On the other hand, it is considered that the negative torque may be generated at the MG using a technique for performing a three-phase on control. However, in this technique, since all of the upper arms or all of the lower arms in the three phases turn on at the same time, and the on-state of the three phases continues, it is difficult to generate the negative torque corresponding to the shift down operation. Specifically, it is difficult to adjust or control the negative torque generated at the MG to be a required negative torque.

SUMMARY

It is an object of the present disclosure to provide an electronic control device for generating a negative torque corresponding to a shift down operation at a motor generator.

According to an aspect of the present disclosure, an electronic control device is mounted on a vehicle having a shift transmission operable by a driver of the vehicle. The electronic control device includes: a battery; a motor generator as a driving power source of the vehicle; a three-phase inverter executing an electricity conversion between the battery and the motor generator bi-directionally; a detector detecting a shift down operation of the driver; an obtaining device obtaining a negative torque corresponding to the shift down operation; a determination device determining whether the battery is chargeable when the detector detects the shift down operation; and a controller controlling the three-phase inverter to generate the negative torque at the motor generator when the detector detects the shift down operation. The three-phase inverter includes three upper arms and three lower arms corresponding to three phases, respectively. When the detector detects the shift down operation, and the determination device determines that the battery is not chargeable, the controller outputs a switching signal to all of three upper arms or all of three lower arms to turn on all of three upper arms or all of three lower arms simultaneously, and the controller outputs a shutdown signal to all of three upper arms or all of three lower arms with executing a PWM control of the shutdown signal.

In the above electronic control device, the controller utilizes the shutdown signal, so that the controller outputs the shutdown signal while a three-phase on control, and controls the PWM control of the shutdown signal. Thus, a three-phase on state corresponding to an off period of the PWM cycle in the shutdown signal and a free running state corresponding to an on period of the PWM cycle in the shutdown signal are mixed as a control state of the motor generator. Further, the controller executes the PWM control of the shutdown signal to generate the negative torque corresponding to the shift down operation. Accordingly, even when the battery is not chargeable, a required negative torque corresponding to the shift down operation is generated at the motor generator.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

A construction of a vehicle will be explained with reference to FIGS. 1 to 4.

Figure 1:
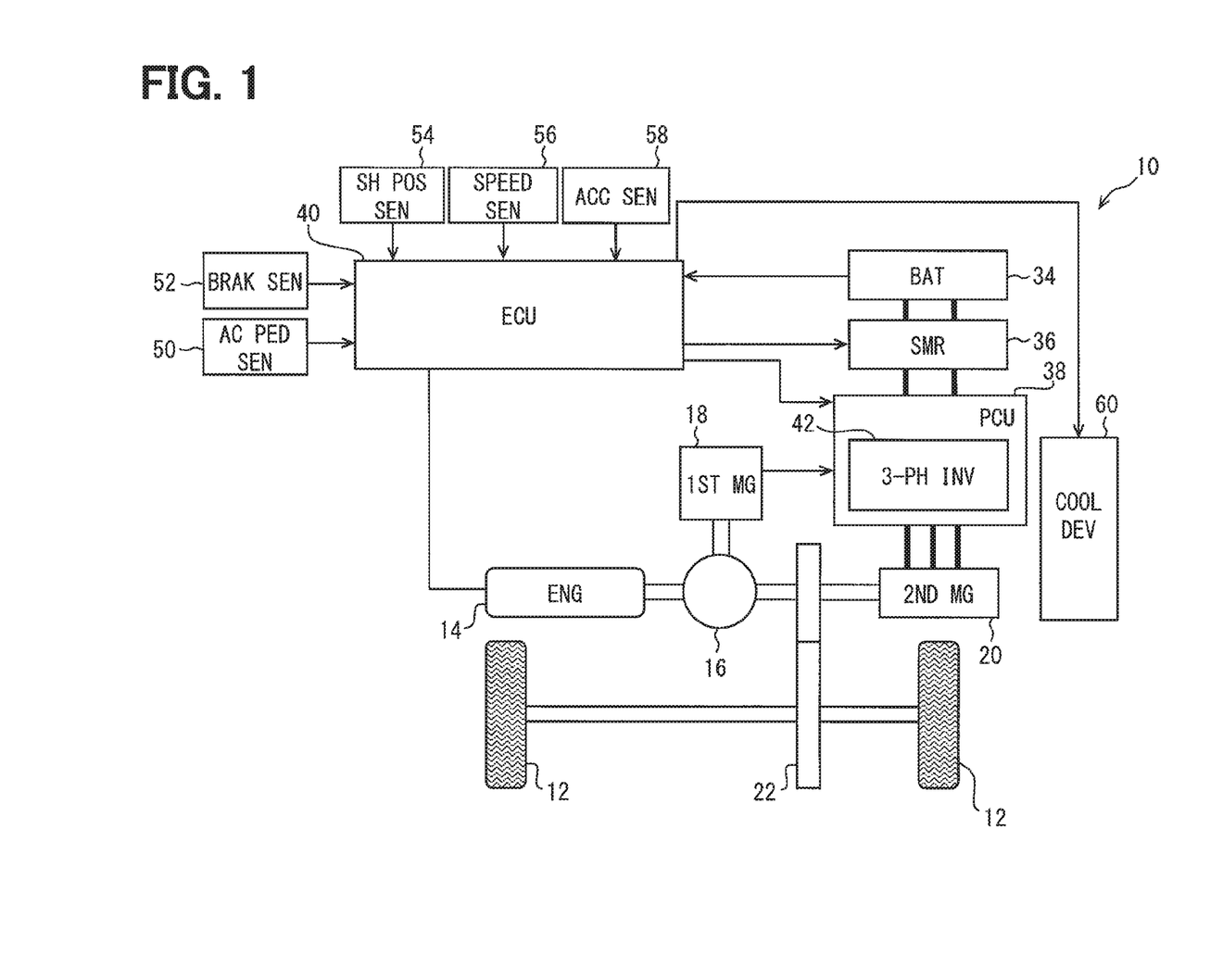
FIG. 1 is a diagram showing a construction of a vehicle, on which an electronic control device is mounted, according to a first embodiment.

A vehicle 10 shown in FIG. 1 includes an engine 14, a power distribution mechanism 16, a first motor generator 18, a second motor generator 20, and a reduction device 22, which are automotive power train for transmitting a driving force to a driving wheel 12. The first motor generator 18 is defined as a first MG 18, and the second motor generator 20 is defined as a second MG 20. Alternatively, the first MG 18 and the second MG 20 may be collectively defined as the MG 18, 20. The vehicle is a hybrid vehicle having the engine 14 and the second MG 20 as the driving power source. In this case, the second MG 20 corresponds to a motor generator.

The three-axis type power distribution mechanism 16 is connected to a crank shaft of the engine 14 via a damper (not shown). Further, the power distribution mechanism 16 is connected to the first MG 18. The first MG 18 generates electricity when the first MG 18 receives the driving force. Further, the first MG 18 functions as a starter when the engine 14 starts. A ring gear (not shown) as a driving shaft corrected to a remaining one axis of the power distribution mechanism 16 is connected to the second MG 20 via the reduction device 22.

The second MG 20 generates the driving force for driving the vehicle 10 when the second MG 20 receives electricity from the battery 34. Thus, the second MG 20 functions as a motor. For example, in order to operate the engine 14 with high efficiency, the second MG 20 generates a power for starting the vehicle 10. Alternatively, the second MG 20 generates the power for compensating the power, which is generated by the engine 14, when the vehicle 14 is accelerated. Further, the second MG 20 coverts the mechanical energy, which corresponds to the rotation of the driving wheel 12, to an electric energy is that the second MG 20 generates electricity when the vehicle 10 reduces the speed. Thus, the second MG 20 executes the regeneration of the energy. In this case, the second MG 20 functions as a generator.

The power distribution mechanism 16 distributes the driving force of the engine 14 to a first MG side and a reduction device side. Further, the power distribution mechanism 16 functions as a transmission. When the vehicle includes the power distribution mechanism 16, the rotation speed of the engine 14 is continuously changed (i.e., in a non-step manner) according to the rotation speed of the first MG 18. Specifically, the power distribution mechanism 16 corresponds to an electric continuously variable transmission. Accordingly, the power distribution mechanism 16 is defined as the electric CVT 16.

Figure 2:
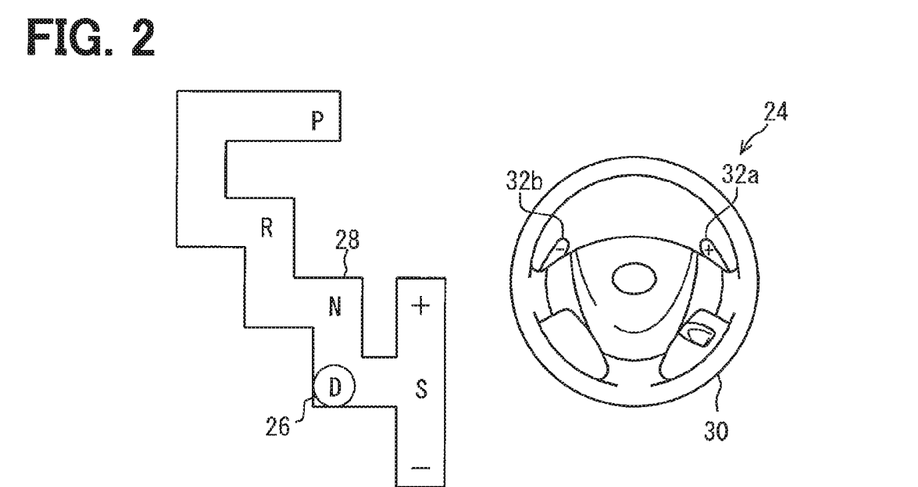
FIG. 2 is a diagram showing a shift lever operation device.

The vehicle 10 includes a shift lever operation device 24 as shown in FIG. 2. The shift lever operation device 24 is arranged near a driver seat. A driver of the vehicle operates a shift lever 26 in the shift lever operation device 24. The shift lever operation device 24 further includes a shift gate 28 having a parking position defined as P, a reverse position defined as R, a neutral position defined as N, a driving position defined as D, and a sequential position defined as S. According to the shift gate 28, the driver can operate the shift lever 26 to be a certain position. A shift position sensor 54 detects which position the shift lever 26 is disposed at. The S position is also defined as a manual position defined as M.

When the shift lever 26 is disposed at the D position, an automatic transmission mode is selected, so that the electric continuously variable transmission is executed. When the shift lever 26 is disposed at the S position, a manual transmission mode as the sequential shift mode is selected. A shift up position, i.e., a "+" position and a shift down position, i.e., a "−" position are arranged on a frontside and a rear side of the S position. At the "+" position, the driver operates the shift lever 26 when the driver manually shifts up the transmission. At the "−" position, the driver operates the shift lever 26 when the driver manually shifts down the transmission. When the driver operates the shift lever 26 to be the "+" position or the "−" position from the S position as the neutral position, a pseudo transmission provided by a hybrid system is shifted up or down. For example, every time when the driver operates the shift lever 26 to be the "−" position once, the transmission is shifted down by one step. Here, the pseudo transmission is provided by adjusting the engine rotation speed according to the control of the first NG 18.

The shift lever operation device 24 includes paddle switches 32a, 32b arranged on a steering wheel 30. Each paddle switch 32a, 32b has a lever shape. The paddle switch 32a outputs an instruction signal for requesting a shift up operation in the manual transmission mode. The paddle switch 32b outputs an instruction signal for requesting a shift down operation in the manual transmission mode. For example, when the driver operates the shift down paddle switch 32b, the transmission is shifted down by one step each time when the driver operates the switch 32b once.

As shown in FIG. 1, the vehicle 10 further includes a battery 34, a system main relay 36, a power control unit 38, and an electronic control device 40. The system main relay 36 is defined as a SMR 36, and the power control unit 38 is defined as a PCU 38.

The battery 34 is a direct current power source chargeable and dischargeable. For example, the battery 34 may be a secondary battery such as a nickel hydride battery and a lithium ion battery. The battery 34 is a high voltage battery, and supplies electricity to a low voltage battery for an accessories.

The SMR 36 is a relay for connecting and disconnecting electrically between the battery 34 and the PCU 38 according to an open/close signal output from the electronic control device 40.

The PCU 38 includes a three-phase inverter 42 and a booster converter (not shown). The three-phase inverter 42 converts the direct current electricity supplied from the battery 34 to an alternating current electricity. Further, the inverter 42 converts the regeneration electricity (i.e., the alternating current electricity) of the second MG 20 to the direct current electricity.

Figure 3:
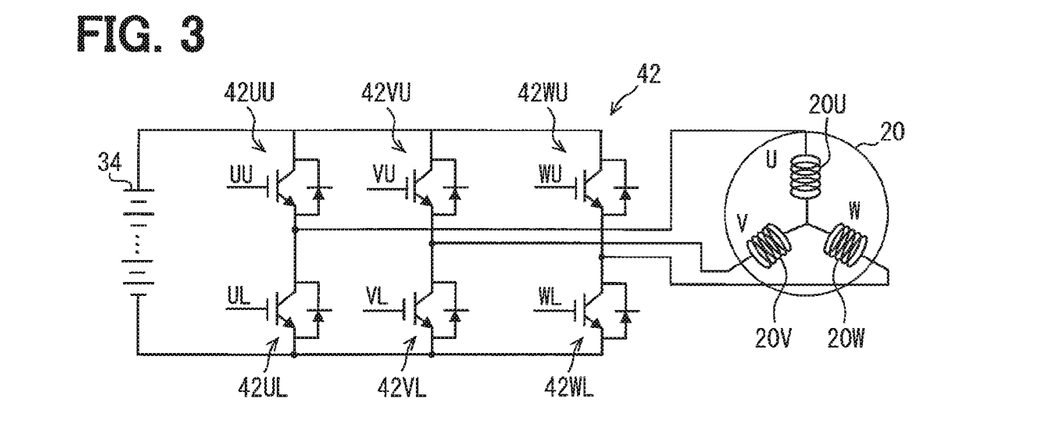
FIG. 3 is a diagram showing a three-phase inverter.

As shown in FIG. 3, the three-phase inverter 42 includes an upper arm 42UU, 42VU, 42WU in three phases and a lower arm 42UL, 42VL, 42WL. The upper arm 42UU and the lower arm 42UL in the U phase are connected in series between a negative terminal and a positive terminal of the battery 34 such that the upper arm 42UU is connected to the positive terminal side (i.e., a high voltage side). A connection point between the upper arm 42UU and the lower arm 42UL in the U phase is connected to a stator coil 20U of the second MG in the U phase via a U phase output line. Similarly, the upper arm 42VU and the lower arm 42VL in the V phase are connected in series between the position terminal and the negative terminal of the battery 34 such that the upper arm 42VU is connected to the positive terminal. The connection point between the upper arm 42VU and the lower arm 42VL is connected to the stator coil 20V of the second MG 20 in the V phase. Similarly, the upper arm 42WU and the lower arm 42WL in the W phase are connected in series between the position terminal and the negative terminal of the battery 34 such that the upper arm 42WU is connected to the positive terminal. The connection point between the upper arm 42WU and the lower arm 42WL is connected to the stator coil 20W of the second MG 20 in the W phase.

Each arm 42UU, 42VU, 42WU, 42UL, 42VL, 42WL includes a switching element and a diode connected to the switching element inversely and flowing back current. The switching element is, for example, a IGBT or a MOSFET.

Figure 4:
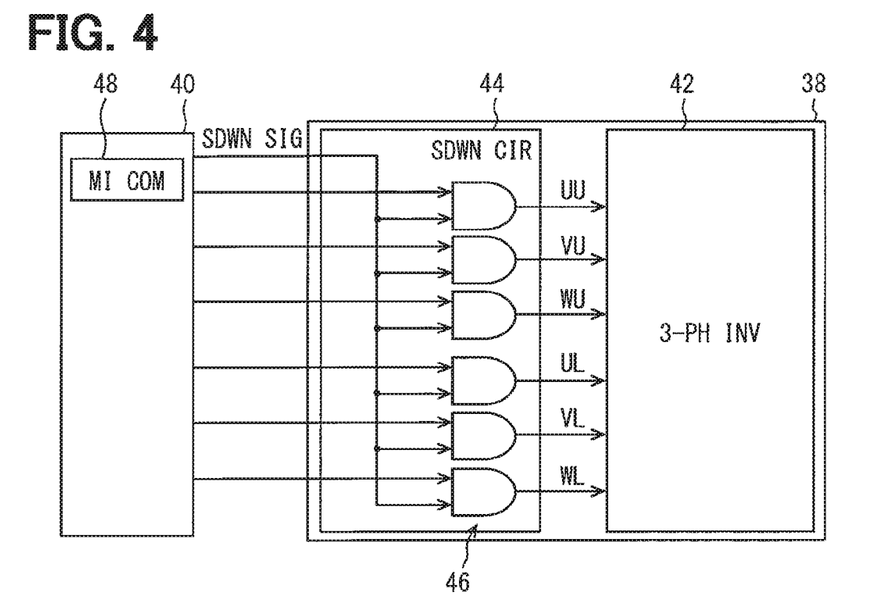
FIG. 4 is a diagram showing a PCU.

As shown in FIG. 4, the PCU 38 includes a shut down circuit 44. The shut down is defined as a SDWN. The SDWN circuit 44 includes six AND gates 46 corresponding to six switching elements of the arms 42UU, 42VU, 42UL, 42VL, 42WL. A switching signal corresponding to the switching element and a SDWN signal as a shut down signal are input into each AND gate 46 from the electronic control device 40. Each AND gate 46 outputs a driving signal UU, VU, WU, UL, VL, WL to the gate of the corresponding switching element. The driving signal UU, VU, WU, UL, VL, WL is prepared by a logical addition of the switching signal and the SDWN signal. For example, the driving signal UU is output to the switching element in the upper arm 42UU in the U phase. The driving signal WL is output to the switching element of the lower arm 42WL in the W phase. In general, the SDWN signal is output, i.e., the SDWN signal is in the on state when the second MG 20 is forcibly stopped.

When the SDWN signal is input, i.e., when the SDWN signal is in the on state, the output of each AND gate 46 becomes zero, i.e., "0". Thus, the switching element stops driving. For example, when the operation of the second MG 20 is to be stopped forcibly, the SDWN signal is output. on the other hand, when the SDWN signal is in the off state, the output of each AND gate 46 corresponds to the witching signal input from the electronic control device 40.

The electronic control device 40 controls a whole of a driving system in the vehicle 10 having the engine 14, the power distribution mechanism 16, the first and second MGs 18, 20 and the PCU 38.

As shown in FIG. 4, the electronic control device 40 includes a micro computer 48. The micro computer 48 includes a CPU, a ROM, a RAM, a register and an I/O port. In the electronic control device 40, the CPU of the micro computer 48 executes a signal processing based on the control program preliminary stored in the ROM and various data obtained via the bus using a temporary storing function of the RAM and the register. Further, the CPU outputs a signal obtained in the signal processing to the bus. Thus, the electronic control device 40 executes various functions.

The electronic control device 40 obtains information from the acceleration pedal sensor 50, the brake sensor 52, the shift position sensor 54, the vehicle speed sensor 56 and the acceleration sensor 58. In general, the device 40 calculates a target behavior value for controlling the behavior of the vehicle to adapt the driving operation of the driver. For example, the electronic control device 40 calculates a target total torque of a whole of the vehicle as the target behavior value in the front rear direction of the vehicle so as to adapt the driving operation of the driver with stabilizing the behavior of the vehicle. Further, based on the target total torque, the device 40 calculates the target torque to be shared by the engine 14 and the target torque to be shared by the MG 18, 20.

In the present embodiment, in order to generate the target torque to be shared by and to be required for the engine 14, the electronic control device 40 controls the engine 14. Specifically, the device 40 controls a throttle valve (not shown) to have a certain opening degree and controls the fuel injection amount and the ignition timing of the engine 14. Further, in order to generate the target torque to be shared by and to be required for the MG 18, 20, the electronic control device 40 controls the PCU 38. Further, the electronic control device 40 monitors the charge state of the battery 34 and controls the battery to be charged and to be discharged.

The information such as the charge and discharge current, the voltage and the temperature of the battery 34 is input into electronic control device 40 from sensors (not shown). The electronic control device 40 calculates the SOC (i.e., state of charge) of the battery 34 based on the accumulation value of the charge and discharge current. Then, the device 40 calculates the input limit Win and the output limit Wout as the maximum allowable electricity to be charged to and discharged from the battery 34 based on the SOC and the temperature. The input limit Win is a charge limitation, and the output limit Wout is a discharge limitation.

The functions of the electronic control device 40 may be shared by multiple electronic control units (i.e., ECUs). For example, the vehicle may include the HVECU, the engine ECU, the MGECU, and the battery ECU, which are communicated and connected with each other, so that multiple ECUs work together to execute the control. Thus, a whole of the driving system of the vehicle 10 may be integrally controlled. In this case, the HVECU integrally controls the engine 14 and the MG 18, 20 to achieve the target torque. The engine ECU controls the engine 14 based on the control instruction from the HVECU. The MGECU controls the MG 18, 20 and the PCU 38 based on the control instruction from the HVECU. The battery ECU monitors the charge state of the battery 34 and controls the battery 34 to be charged and discharged.

As shown in FIG. 1, the vehicle 10 further includes the cooling device 60. The cooling device 60 cools down at least one of the PCU 38 and the second MG 20 including the three-phase inverter 42. In the present embodiment, the cooling device 60 cools down both of the second MG 20 and the PCU 38. The cooling device 60 is supplied the electricity from a low voltage battery. The cooling device 60 includes a pump to be driven by the instruction signal from the electronic control device 40. When the pump of the cooling device 60 is operated based on the instruction signal from the electronic control device 40, the electricity of the low voltage battery is consumed, so that the electricity of the battery 34 is also consumed.

Next, based on FIG. 5, when the shift down operation is performed in the sequential shift mode, the process executed by the electronic control device 40 will be explained as follows. The electronic control device 40 repeatedly executes the following process at predetermined cycles when the power source of the electronic control device 40 is in the on state.

Figure 5:
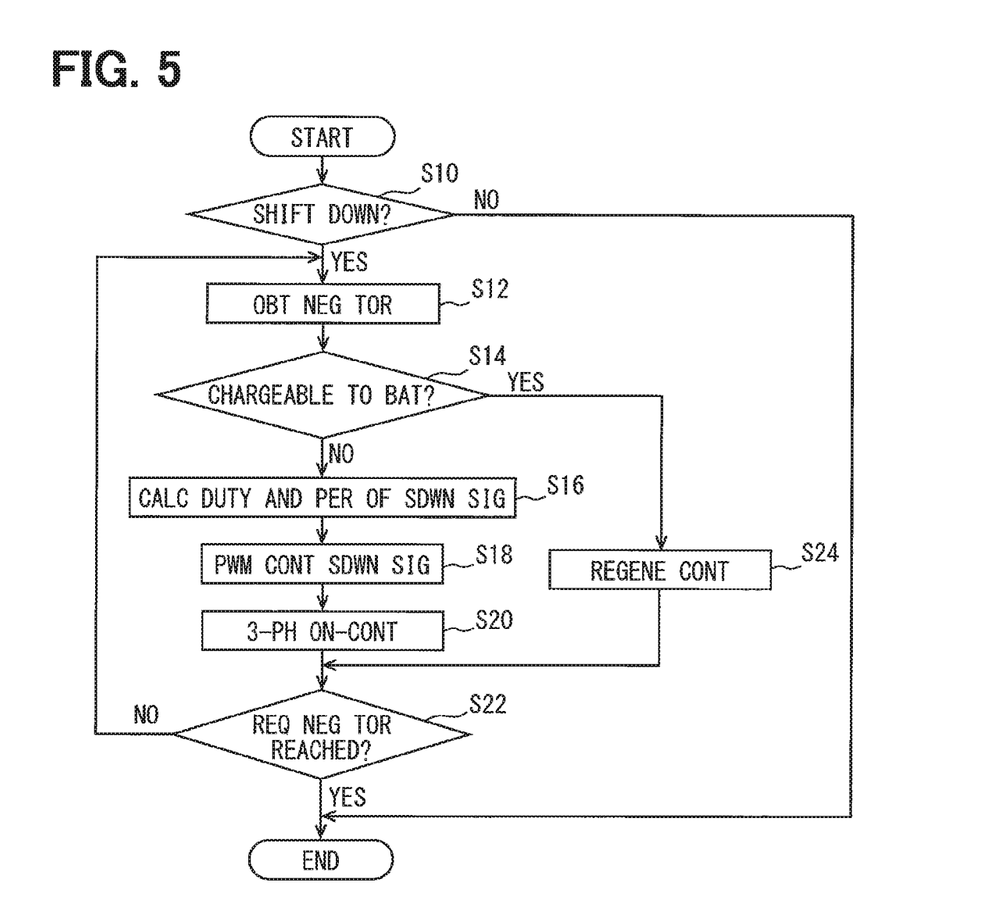
FIG. 5 is a flowchart showing a process executed by the electronic control device when a driver shifts down in a sequential shift mode.

As shown in FIG. 5, at step S10, the electronic control device 40 determines based on the shift position obtained by the shift position sensor 54 whether the shift down operation in the sequential mode is performed. Thus, the existence or non-existence of the shift down operation is determined. Step S10 corresponds to the detection device.

When it is determined that the shift down operation is not performed, the electronic control device 40 completes a series of steps in the process. When the shift down operation is performed, and the existence of the shift down operation is determined, the electronic control device obtains a negative torque T1 corresponding to the shift down operation at step S12. Step S12 corresponds to the obtaining device. For example, the memory in the micro computer stores a map indicative of the relationship among the vehicle speed, the shift down amount, and the negative torque T1. The electronic control device 40 obtains the negative torque T1 based on the map according to the vehicle speed, which is obtained by the vehicle speed sensor 56, and the shift down amount. Alternatively, the negative torque T1 may be calculated from the shift down amount and the vehicle speed according to a predetermined mathematical function or equation.

After the negative torque T1 is obtained, the electronic control device 40 determines at step S14 whether it is possible or impossible to charge the battery 34. Step S14 corresponds to the determination device. In the present embodiment, the electronic control device 40 calculates the input limit Win and the output limit Wout. At step S14, the device 40 determines whether it is possible or impossible to charge the battery 34, based on a feature such that the input limit Win as the charge limitation is smaller than a predetermined threshold.

When it is determined at step S14 that it is impossible to charge the battery 34, the electronic control device 40 controls the three phase inverter 42 in the PCU 38 so as to generate the negative torque T1, obtained at step S12, at the second MG 20.

Specifically, firstly, based on the negative torque T1 obtained at step S12, at step S16, the device 40 calculates the period and the duty ratio of the SDWN signal to generate the negative torque at the second MG 20, based on the negative torque T1 obtained at step S12. Here, the period may be constant. Alternatively, the period may be changed together with the duty ratio. In the present embodiment, the period is constant.

At step S18, the electronic control device 10 executes the PWM control of the SDWN signal based on the calculated period and the calculated duty ratio. Thus, the device 40 outputs the PWM signal as the SDWM signal. As described above, during the on-state period of the SDWM signal in one PWM cycle, the driving of the switching element is stopped. Thus, the second MG 20 is in free running state. During the off-state period of the SDWM signal in one PWM cycle, the driving signal corresponds to the switching signal input from the electronic control device 40.

The electronic control device 40 executes the three phase on control at step S20. In the three phase on control, the switch signal is output to each of the arms 42UU, 42VU, 42WU, 42UL, 42VL, 42WL so as to turn on all of the upper arms 42UU, 42VU, 42WU or all of the lower arms 42UL, 42VL, 42WL in three phases of the three phase inverter 42 at the same time. Accordingly, during the off-state period of the SDWN signal in one PWM cycle, the three-phase on control of the three phase inverter 42, i.e., the second MG 20, is performed. Since the PWM control of the SDWM signal is performed, the required negative torque T1 is generated at the second MG 20 by controlling the duty ratio. Here, the execution order of steps S16, S18 and S20 is not limited to the above order. Step S16 is executed before step S18, and the execution order of step S18 may be reversed to the execution order of step S20.

After step S20 is executed, the electronic control device 40 determines at step S22 whether the required negative torque is obtained, i.e., whether the torque of the vehicle 10 reaches the required negative torque. The electronic control device 40 calculates a negative torque T2 generated at the vehicle 10, based on the acceleration obtained from the acceleration sensor 58 and the radius r of the driving wheel 12 stored in the memory preliminary. Here, the negative torque T2 is calculated based on the equation of T2=m×a×r. Then, the device 40 determines whether the calculated negative torque T2 is substantially equal to the negative torque T1 obtained at step S12. When the calculated negative torque T2 is substantially equal to the negative torque T1, it is determined that the actual torque reaches the required negative torque, and the series of steps in the process end.

At step S22, when it is determined that the actual torque does not reach the required negative torque, the electronic control device 40 returns to step S12, and repeats steps after step S12. Here, the acceleration a may be calculated based on the vehicle speed obtained by the vehicle speed sensor 56. Alternatively, it may be determined based on the vehicle speed instead of the negative torque T2 whether the actual torque reaches the required negative torque. For example, the memory stores, as the map, the relationship among the vehicle speed and the shift down amount, at time when the shift down operation is performed, and the vehicle speed after the shift down operation is performed. It may be determined whether the actual torque reaches the required negative torque, based on a feature such that the vehicle speed obtained at step S22 is substantially equal to a value (i.e., the vehicle speed after the shift down operation is performed) stored in the map.

When it is determined at step S14 that it is possible to charge the battery 34, at step S24, the electronic control device 40 executes the regeneration control of the second MG 20 so as to generate the negative torque obtained at step S12 at the second MG 20. Then, the device 40 executes step S22. In the present embodiment, steps S16, S18, S20, S22 and S24 correspond to the control device.

Next, the effects of the electronic control device 40 will be explained.

Figure 6:
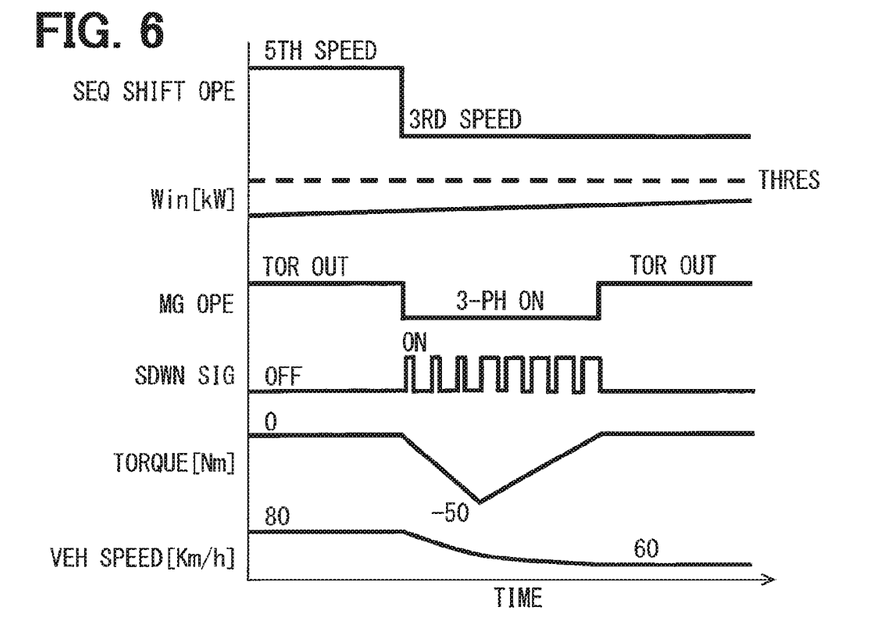
FIG. 6 is a timing chart showing a case where only a three-phase on control is executed.

FIG. 6 shows an example of a case where the electronic control device 40 executes the process when the shift down operation is executed by the sequential shift operation, and the input limit Win of the battery 34 is smaller than the threshold shown as a broken line in FIG. 6, i.e., it is impossible to charge the battery 34.

When the shift down operation is executed by the sequential shift operation, and it is impossible to charge the battery 34, the electronic control device 40 controls the switching signal to be output to the SDWM circuit 44 to turn on all of the upper arms 42UU, 42VU, 42WU or all of the lower arms 42UL, 42VL, 42WL in three phases of the three phase inverter 42 at the same time. The electronic control device 40 executes the PWM control of the SDWN signal to be output to the SDWM circuit 44. Thus, as shown in FIG. 6, the electronic control device 40 executes the PWM control of the SDWM signal during the three phase on control. Thus, only in the off period of the SDWM signal in one PWM cycle, the three phases of the second MG 20 turn on. During the on period of the SDWM signal, the second MG 20 is in the free running state. Thus, the three phase on state and the free running state are mixed as the control state of the second MG 20. Further, the electronic control device 40 executes the PWM control of the SDWM signal so as to generate the negative torque corresponding to the shift down operation. Accordingly, even when it is impossible to charge the battery 34, the required negative torque corresponding to the shift down operation is generated at the second MG 20.

Here, in FIG. 6, in order to generate the required negative torque, the duty ration of the SDWM signal before the actual torque reaches the required negative torque (i.e., −50 Nm) is set to be different from the duty ration of the SDWM signal after the actual torque reaches the required negative torque. Specifically, the duty ration of the SDWM signal is set to be small before the actual torque reaches the required negative torque, so that a large negative torque is generated. After the actual torque reaches the required negative torque, the duty ratio is set to be large. Thus, the required negative torque is generated smoothly.

Figure 7:
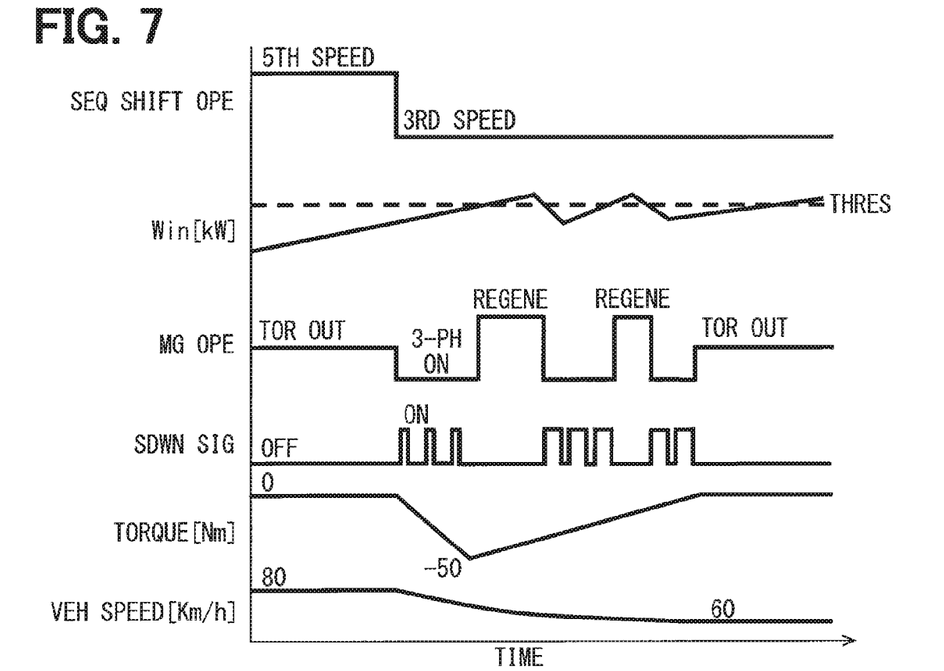
FIG. 7 is a timing chart showing a case where the three phase on control and a regeneration control are combined.

FIG. 7 shows an example of a case where the electronic control device 40 executes the process after the shift down operation is executed by the sequential shift operation, and then, it is possible to charge the battery 34 temporally.

Similar to a case where the input limit Win is smaller than the threshold, the electronic control device 40 executes the PWM control of the SDWM signal during the three phase on control. When the input limit Win is equal to or larger than the threshold, i.e., when it is possible to charge the battery 34, the electronic control device 40 executes the regeneration control of the second MG 20 so as to generate the required negative torque at the second MG 20. Thus, the electricity generated at the second MG 20 is charged to the battery 34 through the PCU 38. In the electronic control device 40 according to the present embodiment, when it is possible to charge the battery 34, the negative torque is generated by regeneration of the second MG 20. Accordingly, it is possible to retrieve the electric energy from the kinetic energy as much as possible.

Thus, in the electronic control device 40 according to the present embodiment, when it is impossible to charge the battery 34, the SDWM signal is utilized, and the PWM control of the SDWM signal is performed during the three phase on control, so that the negative torque is generated at the second MG 20 without generating the regeneration current. This is the first effect. Further, when it is possible to charge the battery 34 temporally, the regeneration control is performed, and the three phase on control (i.e., the PWM control of the SDWM signal) and the regeneration control are combined, so that the negative torque is generated at the second MG 20, and the energy efficiency is improved, this is the second effect. Alternatively, the device 40 may provide only the first effect.

Second Embodiment

A common part in the vehicle 10 and a common part in the electronic control device 40 according to the first embodiment will be skipped to explain.

Figure 8:
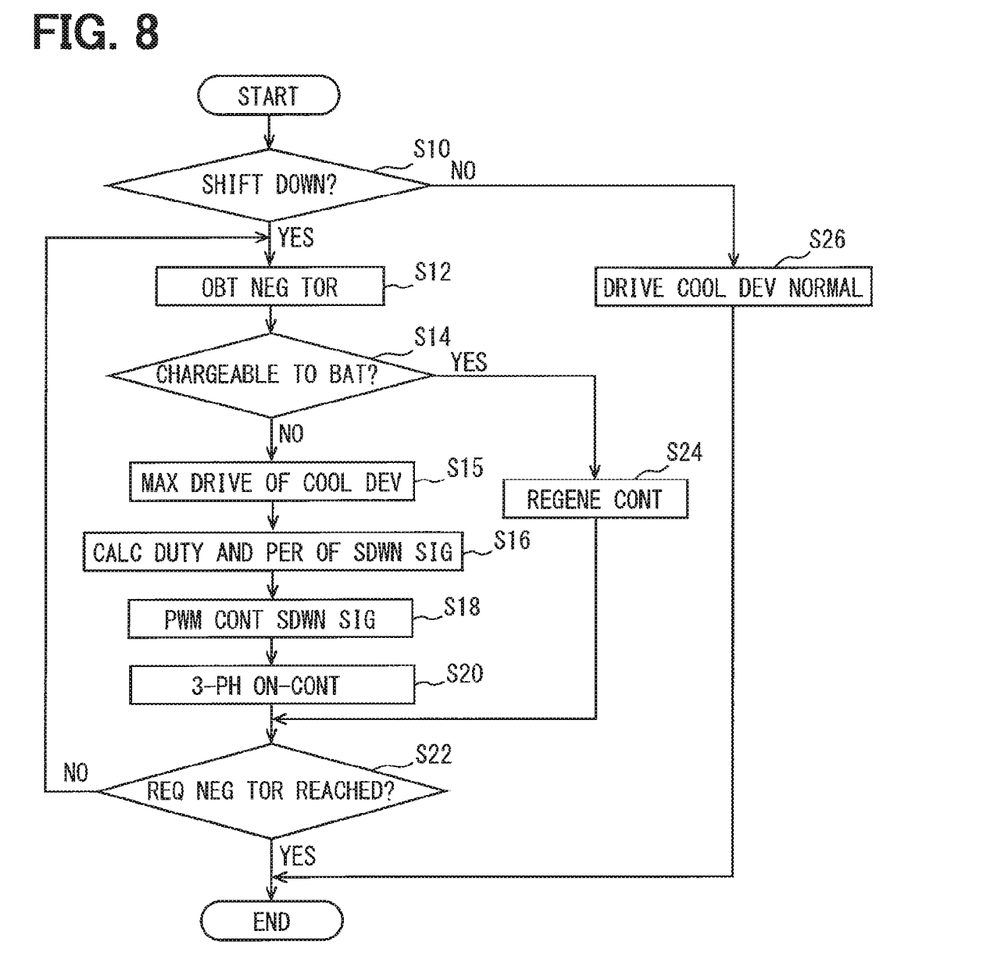
FIG. 8 is a flowchart showing a process executed by the electronic control device when a driver shifts down in a sequential shift mode, according to a second embodiment.

FIG. 8 shows a process executed by the electronic control device 40 according to the present embodiment when the shift down operation is performed in the sequential shift mode. Before step S14, the process is similar to the first embodiment. When it is determined that it is impossible to charge the battery 34, the electronic control device 40 executes the driving control of the pump in the cooling device 60 at step S15 without depending on the sensor values so as to maximize the consumption electricity of the cooling device 60, i.e., so as to drive the cooling device 60 with maximum cooling performance. then, the electronic control device 40 calculates the duty ratio and the period of the SDWM signal similar to the first embodiment. Steps after step S16 are similar to the first embodiment.

When the electronic control device 40 determines at step S10 that the shift down operation by the sequential shift operation is not performed, the device 40 executes the normal control of the pump in the cooling device 60 at step S26. In this case, the cooling device 60 is controlled based on the sensor values. For example, the cooling device 60 is controlled based on the detection signal from a sensor for detecting the temperature of the second MG 20 and the temperature of the PCU 38 such that the cooling performance increases as the temperature increases.

The effects of the electronic control device 40 according to the present embodiment will be explained.

The cooling device 60 is driven by the electricity supplied from the low voltage battery. Accordingly, when the cooling device 60 is operated, the electricity of the battery 34 is consumed. Thus, the cooling device 60 corresponds to the vehicular device. In the present embodiment, when the shift down operation with the sequential shift operation is performed, and it is impossible to charge the battery 34, the cooling device 60 is operated. Specifically, the cooling device 60 is driven so as to maximize the consumed electricity of the cooling device 60. Thus, the electricity consumption of the battery 34 is promoted, so that the regeneration of the second MG 20 is enabled while generating the negative torque.

Further, the cooling device 60 is driven so as to maximize the electricity consumption. Thus, at least one of the second MG 20 and the PCU 38 are cooled down to be low temperature. Accordingly, the failure of the second MG 20 and the PCU 38 caused by heat is effectively restricted. Further, since the second MG 20 and the PCU 38 are cooled down to be low temperature, the frequency of torque restriction attributed to heat (i.e., temperature) is reduced, or no torque restriction is performed while powering.

In the present embodiment, the cooling device 60 provides the vehicular device. Alternatively, the vehicular device may be a different device as long as the vehicular device is driven by consuming the electricity supplied from the battery 34. For example, an air conditioner or the first MG 8 supplied the electricity from the battery 34 may be the vehicular device. Alternatively, an auxiliary device driven by the electricity supplied from the low voltage battery may provide the vehicular device. When the vehicular device consumes the electricity, the battery 34 is enabled to be charged, so that the regeneration of the second MG 20 is enabled while generating the negative torque.

In the above embodiments, the shift operation device 24 includes the puddle switch 32a, 32b. Alternatively, the shift operation device 24 may not include the puddle switch 32a, 32b.

In the above embodiments, the hybrid vehicle includes the engine 14 and the second MG 20 as the driving power source. Alternatively, the vehicle 10 may be an electric vehicle. As long as the vehicle 10 includes the battery, the motor generator as the driving power source, and the three phase inverter for executing the electricity conversion between the battery and the motor generator bi-directionally, and the driver of the vehicle 10 can operate the transmission, the present system is applied to the vehicle 10. For example, in the electric vehicle, when the shift down operation by the sequential shift operation is performed, and it is impossible to charge the battery, the SDWN signal is utilized, and the PWM control of the SDWM signal is performed during the three phase on control, so that the the negative torque is generated by the motor generator as the driving power source without generating the regeneration current.

The electric CVT having the sequential shift function may be different from the above described CVT. Specifically, the electric CVT may be different from the power distribution mechanism 16 (and the first MG 18).

In the above embodiments, the PCU 38 includes the SDWM circuit 44. Alternatively, the electronic control device 40 may include the SDWM circuit 44.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An electronic control device mounted on a vehicle having a shift transmission operable by a driver of the vehicle, the electronic control device comprising:
    a battery;
    a motor generator as a driving power source of the vehicle;
    a three-phase Inverter executing an electricity conversion between the battery and the motor generator bi-directionally;
    a detector detecting a shift down operation of the driver;
    an obtaining device obtaining a negative torque corresponding to the shift down operation;
    a determination device determining whether the battery is chargeable when the detector detects the shift down operation; and
    a controller controlling the three-phase inverter to generate the negative torque at the motor generator when the detector detects the shift down operation, wherein:
    the three-phase inverter includes three upper arms and three lower arms corresponding to three phases, respectively; and
    when the detector detects the shift down operation, and the determination device determines that the battery is not chargeable, the controller outputs a switching signal to all of three upper arms or all of three lower arms to turn on all of three upper arms or all of three lower arms simultaneously, and the controller outputs a shutdown signal to all of three upper arms or all of three lower arms with executing a PWM control of the shutdown signal.

2. The electronic control device according to claim 1, wherein:
    when the detector detects the shift down operation, and the determination device determines that the battery is chargeable, the controller controls the three-phase inverter to generate a regeneration torque at the motor generator.

3. The electronic control device according to claim 2, wherein:
    the vehicle further includes a vehicular device driven by consuming an electricity supplied from the battery;
    when the detector detects the shift down operation, and the determination device determines that the battery is not chargeable, the controller drives the vehicular device.

4. The electronic control device according to claim 3, wherein:
    the vehicular device is a cooling device for cooling at least one of the motor generator and the three-phase inverter;
    when the detector detects the shift down operation, and the determination device determines that the battery is not chargeable, the controller drives the cooling device at maximum electricity consumption.

* * * * *